Feb. 16, 1926.  
W. A. LIEBING ET AL  
REGISTERING METER  
Filed Feb. 24, 1922
1,573,176
2 Sheets-Sheet 1
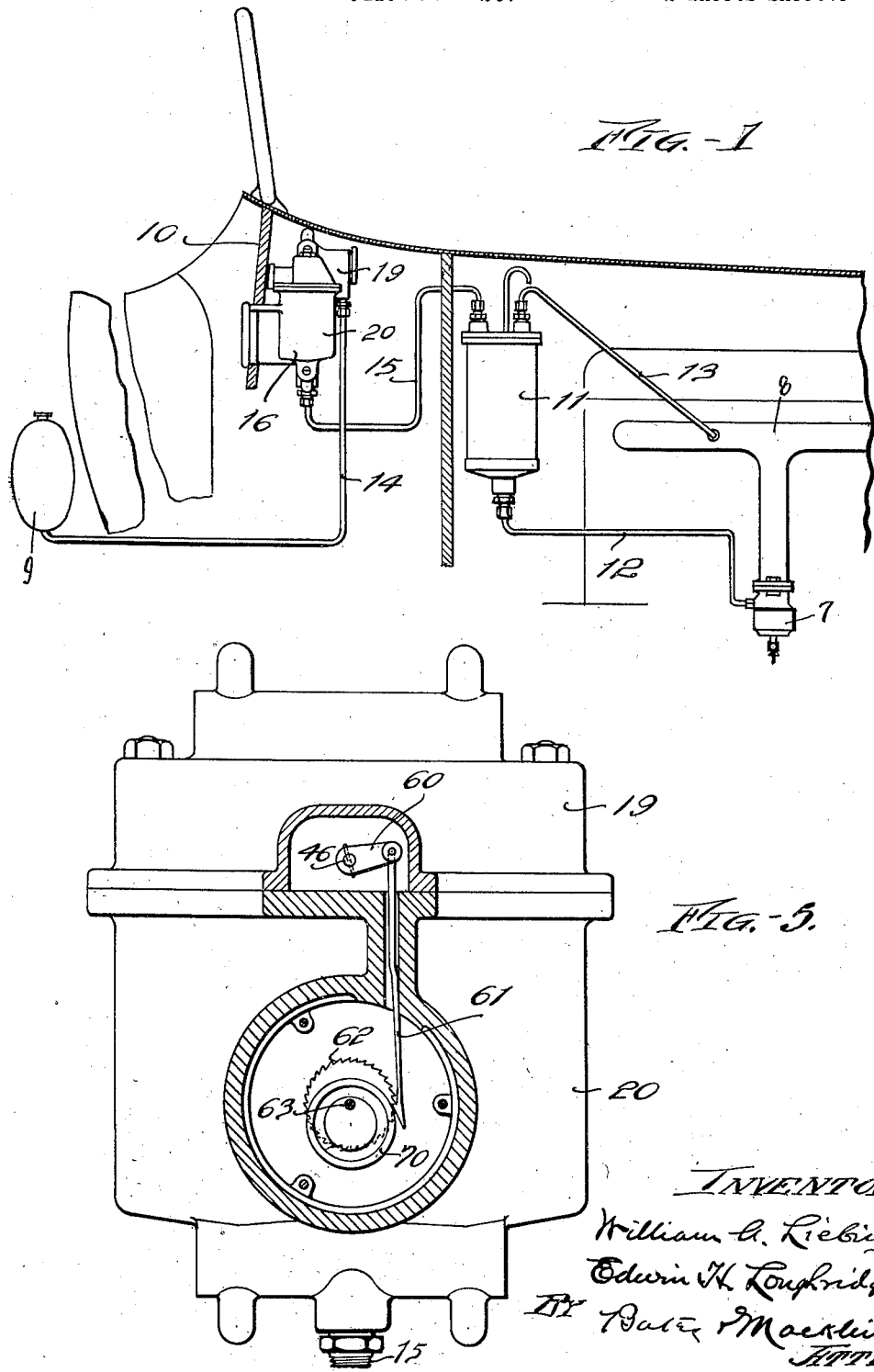

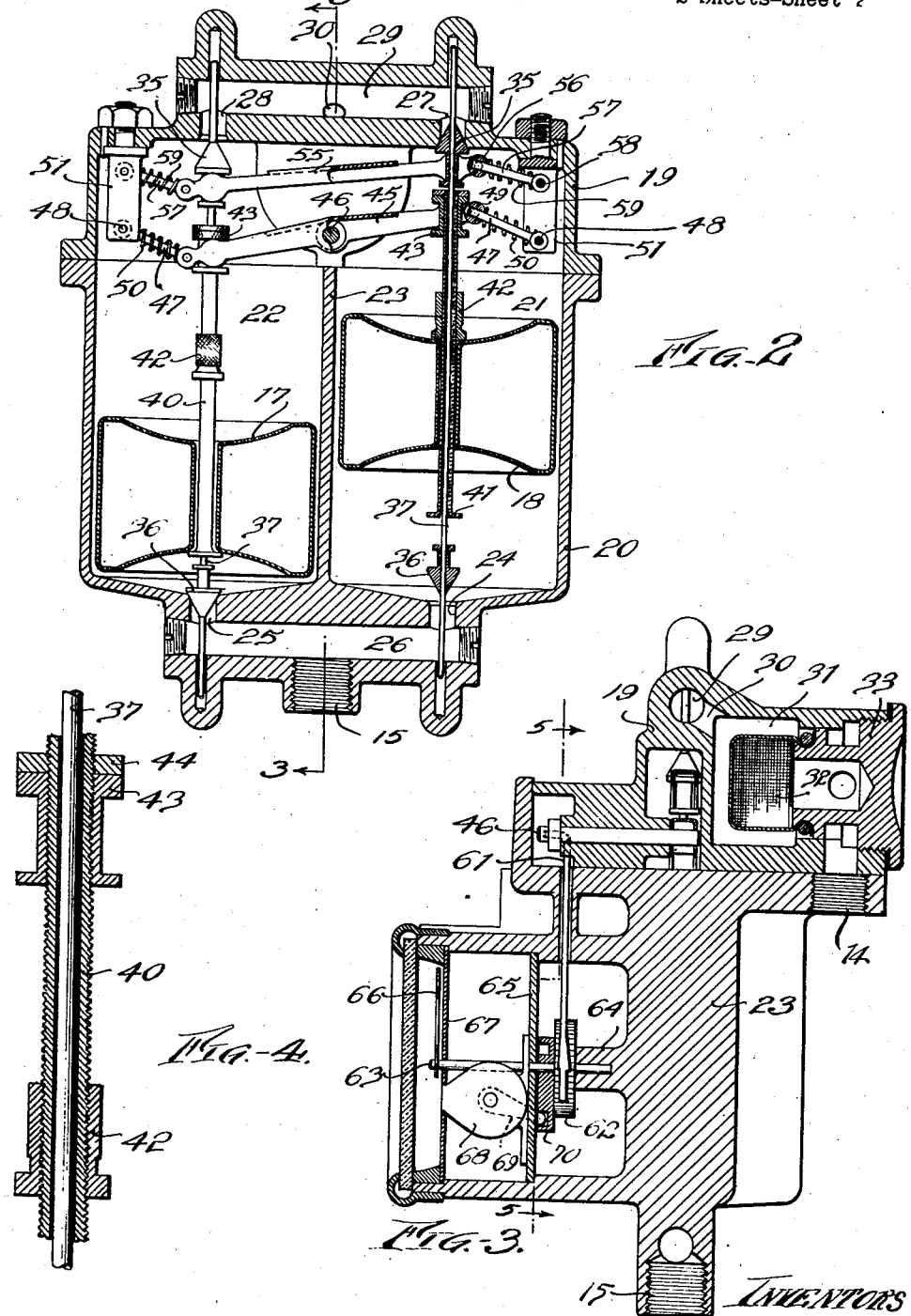

Patented Feb. 16, 1926.

1,573,176

UNITED STATES PATENT OFFICE.

WILLIAM A. LIEBING AND EDWIN H. LOUGHRIDGE, OF CLEVELAND, OHIO.

REGISTERING METER.

Application filed February 24, 1922. Serial No. 538,924.

*To all whom it may concern:*

Be it known that we, WILLIAM A. LIEBING and EDWIN H. LOUGHRIDGE, citizens of the United States, residing at Cleveland, county of Cuyahoga, and State of Ohio, have invented a certain new and useful Improvement in Registering Meters, of which the following is a full, clear, and exact description, reference being had to the accompanying drawings.

This invention relates to apparatus for measuring liquids and has particular reference to a meter which is adapted for use in registering the quantity of liquid passing through a conduit.

Meters which register the aggregate flow of fluid through a conduit, may be advantageously employed in connection with the vending or consuming of fluid, in the latter class being means for measuring the fuel consumption in an internal combustion engine, and the like. Our invention, while of general application is particularly well adapted for a meter constructed for use in registering the aggregate fuel consumption of an internal combustion engine, and in addition contemplates the provision of a meter which is compact, and of such size as to permit installation behind the instrument board of an automobile, whereby the registering dial may project through the board and be visible to the operator.

To this end our invention comprises two compartments or containers which are respectively connected to the source of fuel supply and carburetor. Within the compartments provision is made for floats which permit the containers to be alternately filled and emptied each time the liquid in one compartment or the other reaches a predetermined level. These floats act upon a registering mechanism to register the volume of fluid passing through the containers. In this way, the floats serve a two-fold purpose, namely, the operation of the valves for effecting an alternate flow through the two compartments, and an automatic registration of the volume passing through the compartments.

The means for carrying out our invention is hereinafter more fully set forth in the following description, which relates to the drawings, and the essential characteristics are summarized in the claims.

In the drawings, Fig. 1 is a diagram in the nature of a section through the instrument board of an automobile illustrating our registering meter in conjunction with the supply tank and a vacuum feed tank; Fig. 2 is a vertical section through the meter showing the valve mechanism; Fig. 3 is a transverse section through the meter taken substantially along the line 3—3 in Fig. 2; Fig. 4 is a section of the float-operated plunger on an enlarged scale and Fig. 5 is a section taken on the line 5—5 in Fig. 3.

In the embodiment shown, our meter is adapted for use with the usual vacuum tank, being simply inserted in the main feed line from the supply tank to the vacuum tank.

Designating the parts shown in the drawings by the use of reference numerals, 10 represents the instrument board of an automobile, 11 a vacuum feed tank, 12 the fuel line from the vacuum feed tank to the carburetor 7, 13 the usual vacuum producing line to the engine intake manifold 8. 14 the conduit leading from the supply tank 9, and 15 the conduit from the meter 16 to the vacuum tank 11. The meter is constructed on the float principle, there being two floats 17 and 18, which control the valve mechanism to admit a predetermined quantity of fuel into the vacuum tank, and simultaneously to draw an equal quantity from the supply tank. In the form illustrated, both float chambers are in one casing which in turn is provided with brackets 9 for attachment to the back of the instrument board.

The meter is so designed that the various parts may be cheaply made, and in the embodiment shown, the casing 20 comprises two float chambers 21 and 22 which are separated by a partition 23, and are provided with outlet ports 24 and 25 which lead into a common discharge passageway 26 with which the conduit 15 communicates. A cover 19 rests on the casing and is provided with inlet ports 27 and 28 which are in vertical alignment with the outlet ports 24 and 25, respectively. A common inlet passageway 29 communicates with these inlet ports, through a lateral passage 30 extending into an inlet chamber 31, which in turn communicates with the main fuel line 14. A suitable screen 32 secured to the plug 33 extends within the chamber 31, and provides a means for filtering the fuel as it is drawn into the float chambers.

The valve mechanism within the two chambers is identical, each comprising conical valves 35 and 36 which are rigid with a valve stem 37, and are positioned adjacent the inlet and outlet ports, respectively. The valves are so positioned on the stem that when one inlet port is closed the corresponding outlet port is open, and the respective stems are so connected that the operation of one set of valves automatically actuates the other set.

The means for actuating the valves is embodied in a plunger 40 which is slidable on the stem 37. This plunger is provided with a stop 41 which limits the downward movement of the floats, and with an adjustable nut 42 which limits the upward movement; each of the floats being slidable on the plunger between the stops. Above the stops 42 we provide an adjustable collar 43 and lock nut 44, the collar providing a bearing for a walking beam 45 which is fulcrumed at 46 to the cover 19. The travel of the floats is governed by the distance between the stops 41 and 42, and the amount of movement necessary to actuate the valves, is governed by the location of the collars 43 on the plunger 40.

To hold the walking beam in either extreme position until one, or the other, of the floats reverses the valves, we have shown on each end of the beam an actuating mechanism which is embodied in an arm 47 one end of which is pivoted at 48 to the stationary yoke 51, and the other end of which is slidable in a suitably formed member 49 which is mounted on trunnions near the ends of the walking beam. A spring 50 normally holds the beam in its extreme position, whenever the beam is moved on either side of its central position.

Since the collars 43 are rigid with the plungers 40, then as one end of the walking beam is moved upwardly consequent upon one float rising in the chamber, the other end with its associated plunger is lowered simultaneously until the walking beam and arms 47 are in alignment. Then further movement of the beam forces the arms over dead center whereupon the springs 50 are released and the plungers are snapped into engagement with the valves to open one set and simultaneously close the other. In this way, the sequence of flow is reversed so that the chamber which was emptying commences to fill, and the other, which was filling begins to empty.

To retain the valves in the transposed positions, we provide a connecting link 55, each end of which comprises a yoke which embraces the valves 35. The extreme ends of the link may be provided with members 56 which are identical with the members 49, and are adapted to be engaged by arms 57. These arms are pivoted at 58 to the yokes 51, in a manner similar to the pivoting of the arms 47. A coil spring 59 surrounds each of these arms 57 and tends to retain the valves in extreme position whenever they are moved over dead center.

In the embodiment shown in Fig. 2, the valves are so positioned that the compartment 21 is emptying while the compartment 22 is being filled. As fuel rises in the chamber 22 the float 17 engages the adjacent stop 42 and carries the associated plunger 40 upwardly until the arms 47 and walking beam 45 are in alignment. A slight further upward movement, occasioned by subsequent rising of the float throws the arms off center in the opposite direction, whereupon the springs 59 are released, and the valve stem in the chamber 22 is thrown forcibly upward. When this occurs the opposite end of the walking beam is forced downwardly and with it the plunger 40 in the compartment 21. This plunger on its downward movement strikes the valve 36 thereby closing it and at the same time opening the associated valve 35, whereby the flow is reversed, the chamber 22 now being emptied and the chamber 21 being filled. As liquid flows from the compartment 22, a partial vacuum is created which draws a corresponding quantity of liquid from the fuel tank into the chamber 21. Whenever the position of the valve stems is altered, they are retained in the new position by reason of the fact that the arms 57 are thrown off center, so as to enable the springs 59 to exert their force against the ends of the link 55.

The registering mechanism which is actuated by movement of the valves may be embodied in a rock arm 60, rigid on the rock shaft 46 so that the arm is adapted to be oscillated in accordance with the oscillations of the walking beam. A pawl 61 may be carried by the rock arm and be adapted to engage a ratchet 62 which is rigidly secured to a cam shaft 63 mounted in the lower part of the casing. The cam shaft may be supported on one end by a lug 64 forming part of the casing, and on the other end by a bearing plate 65. The shaft 63 may extend outwardly and have a pointer 66 secured thereto, the pointer being arranged to move around a dial 67, in accordance with the periodic turning of the ratchet wheel.

To register the aggregate flow, we have shown a suitable counter 68 which is provided with a counter arm 69, the free end of which is adapted to be oscillated by a cam 70, eccentrically mounted on the shaft 63. The dial 67 may be calibrated to indicate fractions of a gallon, and the counter to indicate whole gallons, and if desired an additional counter may be provided to indicate trip gallons.

In view of the foregoing description, it will be seen that our invention embodies a simple accurate device which is constructed of only few parts, that are readily adjustable at the factory and incapable of subsequent adjustments by unskilled parties without dismantling the meter. An advantage of a meter constructed in accordance with our invention is that it may be readily attached to an instrument board of an automobile, and be actuated by the usual vacuum tank without necessitating extensive changes in the construction of the motor vehicle.

Having thus described our invention, we claim:—

1. In a liquid meter, the combination with a pair of measuring compartments, each having aligned inlet and outlet ports therefor, a valve stem extending between the ports in each compartment, valves mounted on the stems and so positioned that one inlet valve is open when the corresponding outlet valve is closed, a sleeve slidable on each of said stems, a float loosely embracing the sleeves, said floats being adapted to shift the sleeves relatively to the stems, for actuating said stems, a walking beam connected to the sleeves whereby movement of one stem in one direction effects movement of the other in the opposite direction, and a member disposed intermediate the stems and operatively connected therewith for holding the valve stems in relative position, so that an inlet valve in one compartment and the outlet valve in the other compartment are always open.

2. In a liquid meter the combination with an instrument board, of a lower casing and an upper casing associated therewith, the lower casing comprising a pair of measuring compartments and having an extension adapted to project through the instrument board, float actuated valves associated with each compartment, a walking beam connection intermediate the valves, and mechanism within the extension and operatively connected with the walking beam for registering the volume of fluid passing through the meter.

3. A liquid meter comprising in combination, a pair of measuring compartments, each having aligned inlet and outlet ports, a valve stem and a float in each of said compartments, a valve near each end of said stems, float actuated means loosely mounted on the stems for controlling the valves and a walking beam connecting said means whereby the rising of liquid in either compartment shifts one stem in one direction and the other stem in the opposite direction.

4. A liquid meter comprising in combination, a pair of measuring compartments, each having aligned inlet and outlet ports, a valve stem extending through each set of ports, valves mounted on the respective stems adjacent each of said ports, a sleeve loosely mounted on each stem floats surrounding the sleeves and loosely mounted thereon, and means associated with the sleeves whereby the rising of either float to a predetermined point automatically shifts the stems in opposite directions.

5. A liquid meter comprising in combination a pair of compartments, each having inlet and outlet ports therein, a valve stem in each compartment, valves mounted on the stems adjacent said ports, a member loosely mounted on each of said stems intermediate the valves, a float loosely mounted on said member, adjustable stops on each of said members for limiting the movement of said floats relatively to the member, and a walking beam associated with said members whereby the stems are shifted in opposite directions whenever either of the floats reaches a predetermined level.

6. A liquid meter comprising in combination a pair of compartments each having inlet and outlet ports therefor, a valve stem in each of said compartments, valves carried by the stem, a float actuated member loosely mounted on each of the stems, a float associated with each of said members, a walking beam pivoted intermediate the stems and having the ends thereof connected with said members, and a lost motion connection between the member and valves whereby when either float reaches a predetermined level, the valve stems are shifted in opposite directions.

7. In a liquid meter, the combination with a pair of measuring compartments each having inlet and outlet ports therefor, a valve stem in each of said compartments, valves mounted on the stems adjacent the ports, float actuated members loosely mounted on each of said stems, a float associated with each of said members, a walking beam connection intermediate said members, whereby when either of the floats reaches a predetermined level, the valve stems are shifted in opposite directions, and means for normally holding said valve stems in either extreme position.

8. A liquid meter having in combination, a pair of measuring compartments, each having inlet and outlet ports therefor, a valve stem extending through each set of ports, a plunger slidably mounted on each stem, a float loosely mounted on each plunger, adjustable stops on the plunger for limiting the movement of the floats, a walking beam connection intermediate said members, spring actuating means on either end of the walking beam for normally urging it into either extreme position, and other spring actuated means for normally holding the valve stem in either extreme position.

9. A liquid meter having in combination, a pair of measuring compartments, each having inlet and outlet ports therefor, a valve stem extending through each set of ports, float actuated means surrounding said stems for controlling the operation thereof, spring actuated means for normally urging said float actuated means into either extreme position, and other spring-actuated means for normally holding the valve stems in either extreme position.

10. A liquid meter comprising in combination a pair of measuring compartments each having inlet and outlet ports therefor, a valve stem in each compartment extending through said ports, valves mounted on the stems adjacent the ports, a float surrounding each of said stems and loosely mounted thereon, a member associated with each float and loosely mounted on the adjacent stem for actuating said valves, a walking beam pivoted intermediate said floats and having the ends thereof in engagement with said members, and means including a shaft rigid with said walking beam, and an indicator connected with the shaft for registering the aggregate flow of liquid to said compartments, said registering means being controlled by the oscillations of said walking beam.

In testimony whereof we hereunto affix our signatures.

WILLIAM A. LIEBING.
EDWIN H. LOUGHRIDGE.